& Schaeff

United States Patent [19]

Kuzyk

[11] Patent Number: 4,886,326
[45] Date of Patent: Dec. 12, 1989

[54] INTERLOCK SYSTEM FOR READY TO ASSEMBLE FURNITURE, AND FURNITURE INCORPORATING SUCH SYSTEM

[75] Inventor: Andrew Kuzyk, Carleton Place, Ontario, Canada

[73] Assignee: Tetrad Marketing/Sales Ltd., Ontario, Canada

[21] Appl. No.: 184,247

[22] Filed: Apr. 21, 1988

[51] Int. Cl.$^4$ ............................................. A47B 43/00
[52] U.S. Cl. .................................. 312/257.1; 312/263; 108/111; 108/153
[58] Field of Search .......................... 312/257 R, 263; 403/231, 245, 407.1; 108/27, 111, 153, 155

[56] References Cited

U.S. PATENT DOCUMENTS

| 2,645,546 | 7/1953 | Stringe . | |
|---|---|---|---|
| 2,970,872 | 2/1961 | Ullman, Jr. | 108/27 |
| 3,347,610 | 10/1967 | Pilliod | 312/263 |
| 3,874,753 | 4/1975 | Naito et al. . | |
| 4,009,665 | 3/1977 | Weisheit . | |
| 4,045,104 | 8/1977 | Peterson . | |
| 4,131,376 | 12/1978 | Busse | 403/231 |
| 4,353,663 | 10/1982 | Glickman | 403/407.1 |
| 4,378,137 | 3/1983 | Gibson et al. . | |
| 4,405,253 | 9/1983 | Stockum . | |
| 4,641,988 | 2/1987 | Ganner | 403/245 |

FOREIGN PATENT DOCUMENTS

| 709125 | 5/1965 | Canada . | |
|---|---|---|---|
| 771850 | 11/1967 | Canada . | |
| 786010 | 5/1968 | Canada . | |
| 826550 | 11/1969 | Canada . | |
| 891399 | 1/1972 | Canada . | |
| 1034629 | 7/1978 | Canada . | |
| 1037095 | 8/1978 | Canada . | |
| 1039033 | 9/1978 | Canada . | |
| 1056434 | 6/1979 | Canada . | |
| 1056897 | 6/1979 | Canada . | |
| 1130359 | 8/1982 | Canada . | |
| 1146623 | 5/1983 | Canada . | |
| 1209635 | 8/1986 | Canada . | |
| 1213932 | 11/1986 | Canada . | |
| 1144895 | 3/1963 | Fed. Rep. of Germany | 108/111 |
| 2025211 | 1/1980 | United Kingdom | 312/263 |

Primary Examiner—Kenneth J. Dorner
Assistant Examiner—Brian K. Green
Attorney, Agent, or Firm—Killworth, Gottman, Hagan & Schaeff

[57] ABSTRACT

An interlock secures adjacent panels of ready to assemble furniture in a selected angular relationship and includes a rigid elongated core member including at least a pair of elongated faces thereon disposed in a predetermined angular relationship (usually at right angles) to one another. A plurality of connecting bolts are fixed to the core member and projecting outwardly from each of the elongated faces in predetermined spaced relation to each other along said faces. These connecting bolts are adapted to enter into corresponding bores in the end faces of the panels which are thus secured to the interlock. These connecting bolts each have means thereon for engaging with suitable locking elements, such as cam locks, disposed in the respective bores in the panels whereby the connecting bolts are securely held in the bores with the elongated faces of the core member is close abutting relation to the respectively associated end faces of the panels.

9 Claims, 3 Drawing Sheets

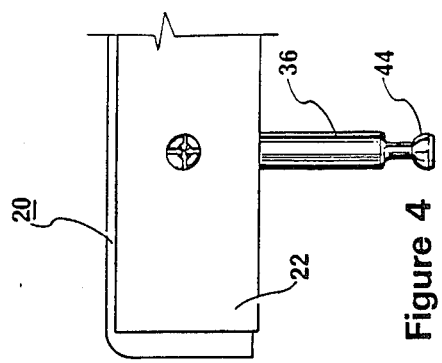
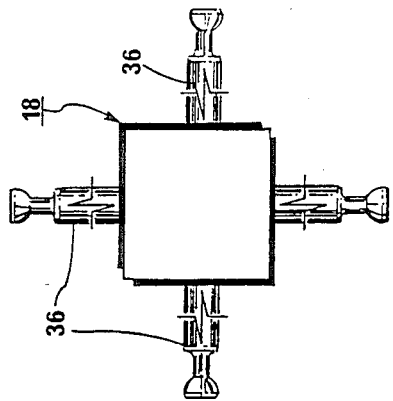
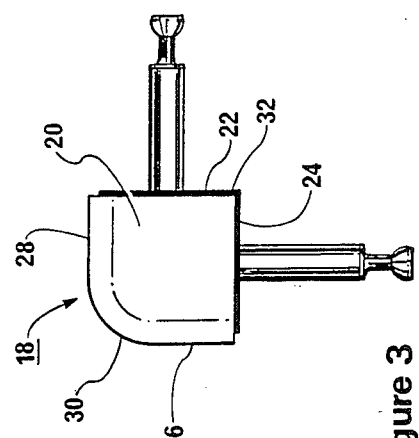
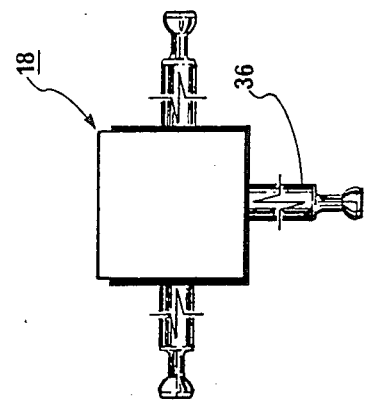
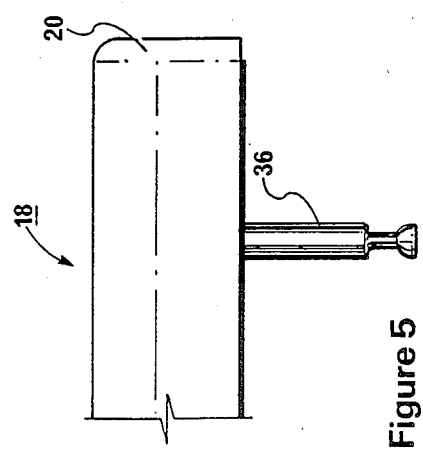
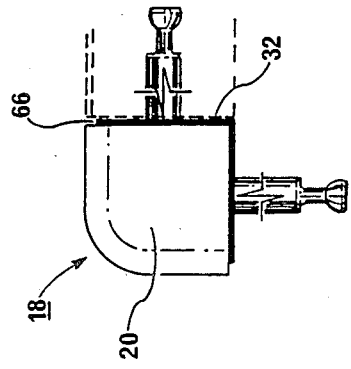

INTERLOCK SYSTEM FOR READY TO ASSEMBLE FURNITURE, AND FURNITURE INCORPORATING SUCH SYSTEM

BACKGROUND OF INVENTION

This invention relates to an interlock system for ready to assemble furniture and to furniture incorporating such an interlock system.

Wood-based furniture including desks, credenzas, mobile pedestals, bookcases, wardrobes and lateral files as well as various other types of residential, dormitory, hospital and computer furniture are typically panel-constructed products. There are two main assembly methods, i.e. conventional and R.T.A. (Ready To Assemble). The conventional method of assembly is a value added process, whereby the product progresses linearly as parts are added, thus making the product more costly and eventually more expensive to ship. The RTA approach involves components that can be produced quickly and that are stored and shipped flat; they are assembled on site with KD (Knock-down) fittings. In RTA furniture, corner junctions play a key role in streamlining inventory, improving production and in offering a variety of finish options and configurations.

It is common in RTA furniture, that the major panels comprise high density particle board in which corner details are treated as an overlap or are flush to the side gables. The work surface and/or top requires either edge banding on all four edges or, if the corner treatment includes an additional piece of material, it is attached permanently. Some manufacturers keep these panels in one piece so that its inherent strength is maintained but in doing so often run into inventory and production problems, limit their colour options and have extreme product renovation problems. Unfortunately, furniture of this type has compromised potential RTA efficiency through appearance and system.

SUMMARY OF INVENTION

It is a general objective of the invention to provide an interlock system which alleviates many of the problems noted above.

Further objectives are to provide:

an interlock system through which the major forces pass from one panel to the next;

an interlock system which is operatively interposed between major panels and connected to them (as distinct from direct attachment between major panels);

an interlock system wherein one design or colour of interlock may be used with a variety of other panel surfaces and/or colours;

an interlock system well suited for use with weak panel materials such as particle board since the panel per se is not required to provide the strength of the attachment;

an interlock system wherein increased interchangeability of component parts is permitted thus reducing the variety of component parts required to be made up;

an interlock system wherein reduced edge banding of edges is needed as compared with conventional systems;

an interlock system wherein provision can be made for accommodation of tolerance variations in the material thickness of component parts.

Accodingly the invention, in one aspect, provides an interlock for securing adjacent panels of ready to assemble furniture in a selected angular relationship comprising:

a rigid elongated core member including at least a pair of elongated faces thereon extending lengthwise of the core member and disposed in a predetermined angular relationship to one another;

a plurality of connecting devices fixed to said core member and projecting outwardly from each of said elongated faces in predetermined spaced relation to each other along the lengthwise extents of said faces, said connecting devices adapted to enter into corresponding bores in the end faces of the panels which are to be secured;

said connecting devices each having means thereon for engaging with locking elements disposed in the respective bores in the panels whereby the connecting devices may be securely held in said bores with said elongated faces of the core member in close abutting relation to the respectively associated end faces of the panels.

In a narrower aspect of the invention said elongated faces of the core member comprise planar surfaces and said connecting devices projecting outwardly therefrom at right angles to the planar surfaces with which they are associated. The connecting devices may be one of several available K D (knowckdown) connectors.

The above noted planar surfaces may be at any selected angle to one another although for most applications they will be at right angles or parallel to one another. Either two, three, or four of such surfaces may be required, depending on the application.

In a further aspect of the invention said connecting devices are adapted to co-operate with rotatable cam locks disposed in the respective bores of the panels, said cam locks exerting tensile forces on said connecting devices when in use. The connecting devices preferably are in the form of elongated members, termed bolts herein.

In a preferred embodiment there is provided a layer of plastic or other suitable material overlying said elongated faces of the core member and arranged to assist in taking up tolerance discrepancies in the thickness of panels which, in use, abut said elongated faces.

The invention also provides ready to assemble furniture comprising at least a pair of rigid panels each having opposed major surfaces, each panel defining minor end faces having respective parallel bores therein and an interlock as defined above secured to said pair of panels with said connecting devices being disposed in said parallel bores and the end faces of the panels being in close abutting relation with the respective elongated faces of the core member whereby said rigid panels are secured in a predetermined angular relationship with one another.

As a further feature of the invention there is provided locking elements in the parallel bores each engaged with a respective one of said connecting devices and holding the elongated faces of the core member in close abutting relation with the respective end faces of the rigid panels. Preferably said locking elements comprise rotatable cam locks each rotatable about an axis normal to the opposed major panel surfaces for exerting tensile forces on the connecting devices or bolts.

Further features and advantages of the invention will become apparent from the following detailed description of preferred embodiments of the invention.

BRIEF DESCRIPTION OF THE DRAWINGS

FIGS. 3, 4 and 5 are end, rear and front views respectively, of a typical interlock member in accord with the invention;

FIGS. 6, 7 and 8 are end views of two-way, three-way and four-way interlock members.

DETAILED DESCRIPTION OF PREFERRED EMBODIMENTS

Figure 1:
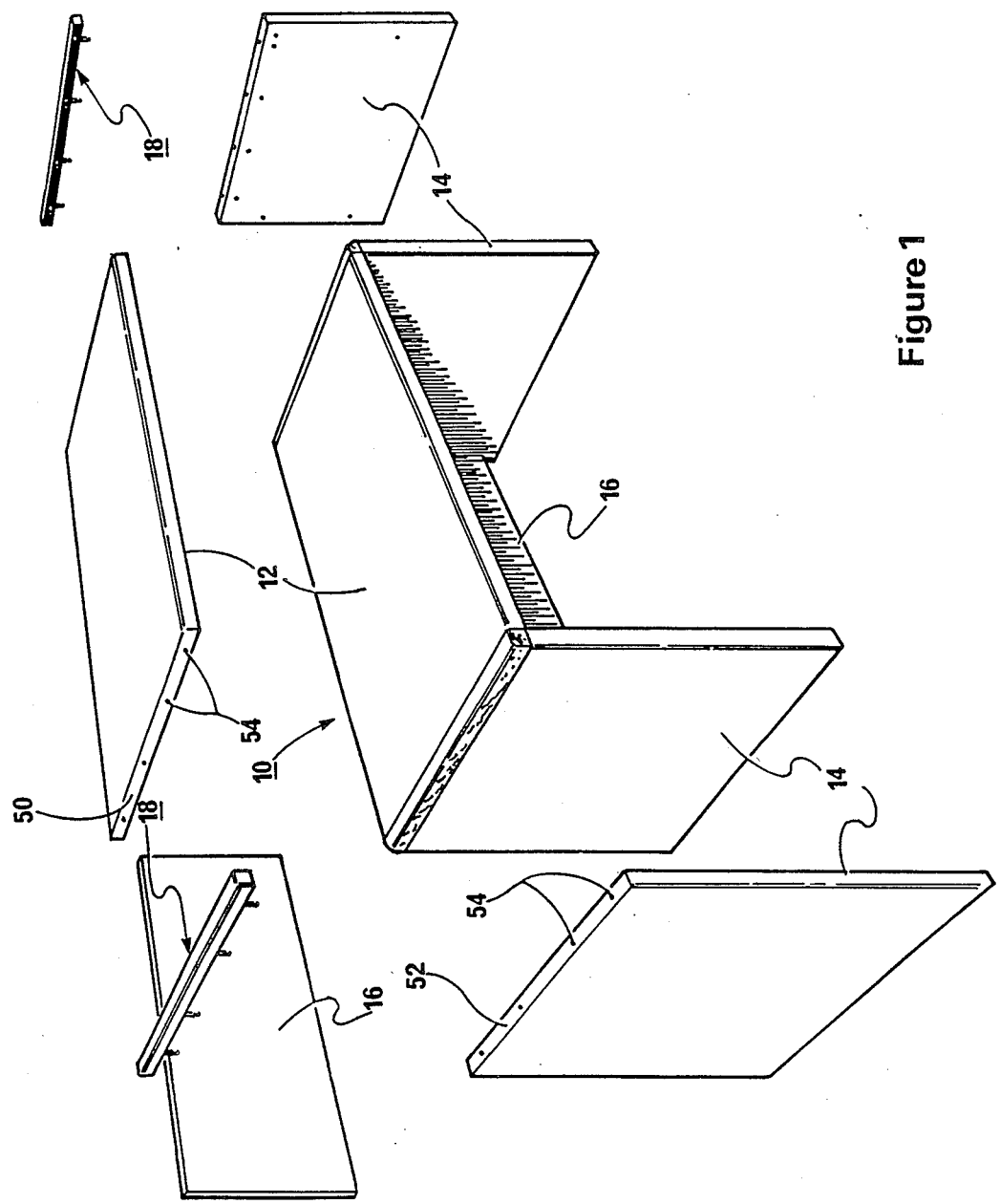
FIG. 1 is a perspective view showing a typical piece of RTA furniture incorporating the interlock system of the invention in both assembled and "exploded" condition.
Figure 2:
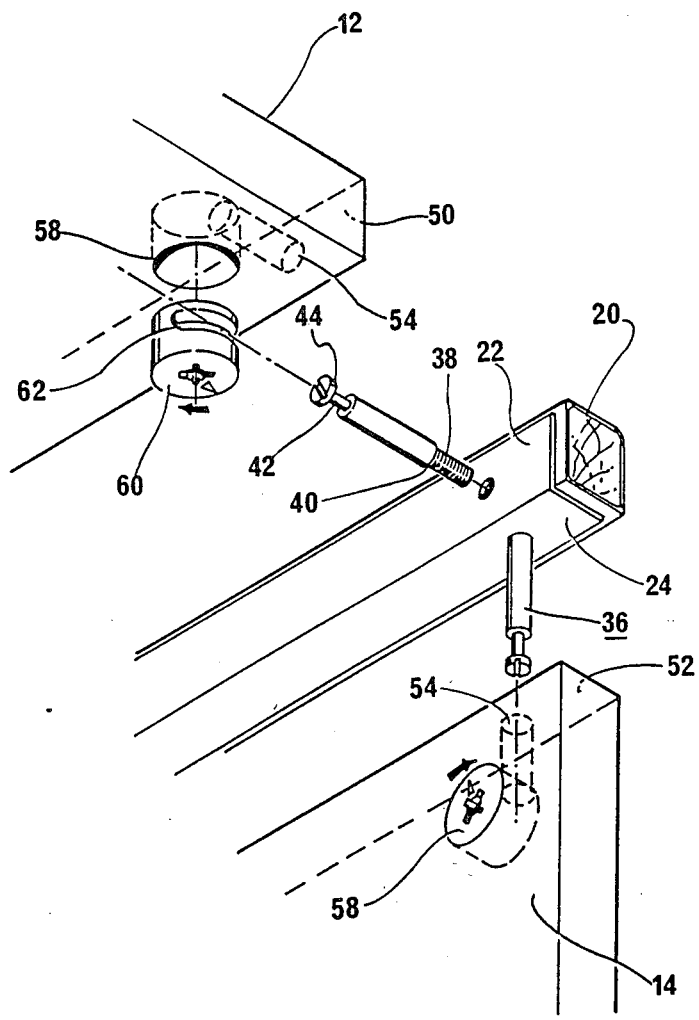
FIG. 2 is a partially exploded perspective view illustrating the manner in which the connecting bolts and rotatable cam locks cooperate with one another.

FIG. 1 shows a desk structure 10 including a horizontal top panel 12, vertical end panels 14, and a vertical frontal panel 16. Top panel 12 is joined at its opposing ends by a pair of interlock members 18 to the upper edge portions of vertical end panels 14 in the manner to be described more fully hereinafter. Panel 16 is shown as joined to the end panels 14 by any suitable or conventional fasteners (not shown).

The interlock member 18 is shown in more detail in FIGS. 2-6. It includes an elongated rigid core member 20 of a material having substantial strength and rigidity, such as hardwood, e.g. oak, maple, walnut, etc. although various reinforced plastics and various wood, metal plastic and fibre combinations could be used as well depending on the circumstances. As shown in the drawings, this core member 20 includes at least two elongated planar faces 22, 24 thereon disposed at a selected angular relation to one another said faces 22, 24 extending lengthwise of the elongated core member. In FIGS. 2-5 these two faces 22, 24 are at 90° to each other while the remaining faces 26, 28, (which in use are exposed to view) are smoothly finished and connected by a smoothly contoured transition portion 30 to provide an eye-pleasing effect. The profile shape may be selected as desired of course and the colouring and texture of the surfaces 26, 28 and 30 may of course be selected so as to either match the panel surfaces or to provide a pleasing contrast therewith.

The planar faces 22, 24 are shown as including an overlay or cladding 32 of plastic e.g. vinyl, in this case being in the form of an extrusion bonded to the core member 20 and being fairly thin, e.g. about 0.050 inch thickness. In other cases this overlay may be made thicker and can be made of metal. It could even be partially inset into the core member. The function of this overlay will be described hereafter.

A multiplicity of connecting bolts 36 are fixed in the core member 20 and project outwardly from the faces 22, 24 at right angles to such surfaces and in pre-selected spaced relation to one another along the lengthwise extent of the core member 20 and along the lengthwise extents of the elongated faces 22, 24. Each bolt 36 includes a threaded shank portion 38 which engages the core member, and a shoulder 40 which establishes the depth of penetration of the bolt into the core. (In the case where the cladding 32 is made of strong metal the bolts could, alternatively, be welded to this cladding.) The body of the bolt 36 is plain and of selected diameter and the outer end is provided with a deep annular groove 42 defining a head 44.

The minor end faces 50, 52 of the panels 12 and 14 are each provided with a series of parallel bores 54 extending parallel to the panel major surfaces, spaced apart and sized so that the connecting bolts 36 enter snugly into these bores. The panels 12 and 14 are also provided with drilled recesses 58, each intersecting a respective one of the bores 54. Recesses 58 each receive a respective one of a series of quarter-turn female cam locks 60. Each cam lock 60 is provided with an arcuate recess 62 within which the head 44 of the connecting bolt 36 is engaged. The arcuate recess 62 has internal walls which spiral radially inwardly such that as the cam lock 60 is rotated, the connecting bolt is drawn into the bore 54. The length of each connecting bolt 36 is of course chosen relative to the position of each cam lock 60 so that when the cam locks 60 have been rotated to their home positions, the end faces 50, 52 of the panels 12, 14 are in tight abutting relation to the elongated faces 22, 24 of the interlock core member 20. This action serves to fix the panels 12, 14 relative to one another in the desired right angle relationship.

The above noted connecting bolts 36 and cam locks 60 are widely available commercially, such as those known as "minifix" connectors by Hafele.

The cam locks 60 are readily accessible from the inside or hidden surfaces of the panels 12 and 14 and can be rotated by a screwdriver. Assembly is quick and easy.

It was noted above that faces 22, 24 of interlock core member 20 are provided with a cladding 32 of plastic or other material such as metal. As best seen in FIG. 6, this cladding does not come all the way to the edges of member 20 thereby defining a groove or gap 66 between the core member and the minor end faces 50, 52 of the panels connected thereto. This groove provides the product with a transition to take away any visual discrepancy that may be caused by moisture absorption expansion and thus any tolerancing problem between end faces 50, 52 of the panels connected thereto.

Alternate forms of the interlock are shown in FIGS. 7 and 8. FIG. 7 is a three way variety with a spaced series of connecting bolts 36 projecting normal to each of the three planar faces thereof thereby to rigidly hold three panels (not shown), two of such panels to be held in co-planar relation, while the third is at right angles thereto. The four-way variety of FIG. 8 has four series of connecting bolts for holding two pairs of panels (not shown) in mutually perpendicular relation. From these examples it can be seen that a very wide variety of desks, shelving units, tables, coffee tables, end tables, storage units and the like can be made up for residential, office, dormitory, hospital and other institutions as the case may be. In the usual case, where particle boards or laminates are used as the panel members, the amount of edge banding is reduced as the raw edges of the panels butt up against the interlock, thus concealing them. The joint is strong and well suited for use with relatively weak materials such as particle board since the attachment is made via the interlock and not directly panel-to-panel. One design or colour of interlock may be used with a variety of other panel surfaces and colours to provide eye-pleasing contrasts if desired. Various panels, such as panels 14, are identical to one another and interchangeable thus reducing the variety of different parts to be made up.

I claim:

1. An interlock for securing adjacent panels of ready to assemble furniture in a selected angular relationship, which panels include opposed major panel surfaces and minor panel end faces transverse to said major panel surfaces, said interlock comprising:

a rigid elongated core member including a pair of elongated faces thereon disposed in a predetermined angular relationship to one another with each of said elongated faces extending lengthwise of the elongated core member;

a plurality of connecting devices fixed relative to said core member and projecting outwardly from each of said elongated faces in predetermined spaced apart relation to each other along the lengthwise extents of each of said elongated faces, said connecting devices adapted to enter into correspondingly spaced apart bores in the minor end faces of the panels which are to be secured;

said connecting devices each having means thereon for engaging, in use, with locking elements disposed in the respective bores in the minor end faces of the panels whereby the connecting devices may, in use, be securely held in said bores with said elongated faces of the core member in close abutting relation to the respectively associated minor end faces of the panels, and wherein said elongated faces of the core member each comprise an elongated substantially planar surface with said pair of elongated planar surfaces being substantially at right angles to each other and said connecting devices projecting outwardly substantially at right angles to said elongated planar surfaces with which said connecting devices are respectively associated.

2. The interlock of claim 1 wherein said connecting devices comprise bolts adapted to cooperate with rotatable cam locks disposed in the respective bores of the panels, said cam locks exerting tensile forces on said connecting bolts when in use.

3. The interlock of claim 1, including a layer of material overlying said elongated faces of the core member and arranged to assist in taking up tolerance discrepancies in the thickness of panels which, in use, abut said elongated faces.

4. The Interlock of claim 1, wherein each of said connecting devices comprises an elongated bolt.

5. An interlock for securing adjacent panels of ready to assemble furniture in a selected angular relationship, which panels include opposed major panel surfaces and minor panel end faces transverse to said major panel surfaces, said interlock comprising:

a rigid elongated core member including a plurality of elongated faces thereon disposed in a predetermined angular relationship to one another with each of said elongated faces extending lengthwise of the elongated core member;

a plurality of connecting devices fixed relative to said core member and projecting outwardly from each of said elongated faces in predetermined spaced apart relation to each other along the lengthwise extents of each of said elongated faces, said connecting devices adapted to enter into correspondingly spaced apart bores in the minor end faces of the panels which are to be secured;

said connecting devices each having means thereon for engaging, in use, with locking elements disposed in the respective bores in the minor end faces of the panels whereby the connecting devices may, in use, be securely held in said bores with said elongated faces of the core member in close abutting relation to the respectively associated minor end faces of the panels, and wherein said elongated faces of the core member each comprise an elongated substantially planar surface and said connecting devices projecting outwardly at right angles to said planar surfaces with which said connecting devices are associated, there being at least three of said planar surfaces each of which has said connecting devices projecting outwardly therefrom.

6. An interlock for securing adjacent panels of ready to assemble furniture in a selected angular relationship, which panels include opposed major panel surfaces and minor panel end faces transverse to said major panel surfaces, said interlock comprising:

a rigid elongated core member including a plurality of faces thereon disposed in a predetermined angular relationship to one another with each of said faces extending lengthwise of the elongated core member;

a plurality of connecting devices rigidly fixed relative to said core member and projecting outwardly rom each of said faces in predetermined spaced apart relation to each other along the lengthwise extent of said elongated core member, said connecting devices being adapted to enter into correspondingly spaced apart bores in the minor end faces of the panels which are to be secured;

said connecting devices each having means thereon for engaging, in use, with locking elements disposed in the respective bores in the minor end faces of the panels whereby the connecting devices may, in use, be securely held in said bores with said faces of the core member in close abutting relation to the respectively associated minor end faces of the panels, and wherein said plurality of faces of the core member each comprise planar surface portions substantially at right angles to each other and said connecting devices projecting outwardly at right angles to said planar surface portions with which said connecting devices are associated.

7. The interlock of claim 6 including at least three of said planar surface portions each of which has said connecting devices projecting outwardly therefrom.

8. The interlock of claim 6 wherein said connecting devices comprise bolts adapted to cooperate with rotatable cam locks disposed in the respective bores of the panels, said cam locks exerting tensile forces on said connecting bolts when in use.

9. The interlock of claim 6 including a layer of material overlying said faces of the core member and arranged to assist in taking up tolerance discrepancies in the thickness of panels which, in use, abut said faces.

* * * * *

UNITED STATES PATENT AND TRADEMARK OFFICE
CERTIFICATE OF CORRECTION

PATENT NO. : 4,886,326
DATED : December 12, 1989
INVENTOR(S) : Andrew Kuzyk

It is certified that error appears in the above-indentified patent and that said Letters Patent is hereby corrected as shown below:

On title page of patent, please add:

Foreign Application Priority Data

January 29, 1988  Canada          557,678

Signed and Sealed this

Seventh Day of February, 1995

Attest:

BRUCE LEHMAN

*Attesting Officer*  *Commissioner of Patents and Trademarks*